Aug. 11, 1964 R. H. MOEHLMANN 3,144,567

PULSE GENERATORS

Filed March 31, 1961

INVENTOR.
RICHARD H. MOEHLMANN
BY T. L. Styner
ATTORNEY

United States Patent Office 3,144,567

Patented Aug. 11, 1964

3,144,567
PULSE GENERATORS

Richard H. Moehlmann, Rochester, N.Y., assignor to General Dynamics Corporation, Rochester, N.Y., a corporation of Delaware Filed Mar. 31, 1961, Ser. No. 99,823
4 Claims. (Cl. 307—108)

This invention relates to pulse generators and is particularly directed to means for the generation of pulses of high voltage, high power, and of uniform amplitude, and having a wide range of pulse repetition rates.

The pulse generators contemplated here are of the type which may be employed to modulate a powerful high frequency source, such as a magnetron or klystron. The direct current power required for operating the pulse generator, even though the modulating pulse may be less than a microsecond, is sufficient that efficiency of the generator is important. Heretofore such pulse generators have comprised a relatively large storage condenser connected in series with the load and with switch means for discharging the condenser through the load. Where the pulse repetition rate may be high and successive pulses relatively close, it is required, of course, that the charging time of the storage condenser be short. This requires a low impedance, high current power source. Unfortunately, the storage condenser has internal and external leakage paths and immediately starts discharging after each charge, so that when the pulse repetition rate changes, the amplitude of the condenser voltage changes. There results the undesirable effect that pulse amplitudes are not uniform but vary with variable duty cycle.

An object of this invention is to provide an improved generator of pulses of uniform high power, even though the repetition rate may vary widely.

A more specific object of this invention is to provide an improved generator of pulses of uniform high power over a wide range of pulse repetition rates and having high power-conversion efficiency.

The objects of this invention are attained by resonantly charging a storage condenser through an inductance and a rectifier having a low impedance and high current carrying capacity for resonantly charging the storage condenser to a voltage substantially twice the voltage of said source. Across the storage condenser is connected a second voltage source having a high impedance and low current capacity for maintaining substantially constant the charge voltage of the condenser. The pulse generator of this invention produces pulses of uniform high power even though the repetition rate varies widely, and attains these objects without substantial consumption of additional power.

Other objects and features of this invention will become apparent to those skilled in the art by referring to the specific embodiments described in the following specification and shown in the accompanying drawings, in which.

Figure 1:
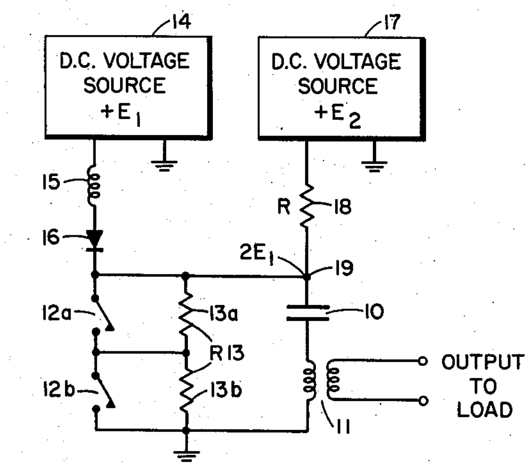
FIG. 1 is a simplified circuit diagram illustrating the principles of this invention.

The pulse generator of FIG. 1 comprises the storage condenser 10 connected in series with a load consisting, in the example shown, of transformer 11. The energy of condenser 10 is discharged through the load by closing switch means 12, which may comprise, preferably, semiconductor four-layer diodes, gaseous discharge devices, or other switch means. Mechanical switches are shown for ease of illustration. Where the stored voltage is relatively high, it becomes necessary to provide a number of series connected switches **12*a*, 12*b*, etc., and to add voltage dividing resistors 13*a* and 13*b*** across the switches to equalize and reduce the potential gradients to be switched.

Storage condenser 10 is charged by D.C. voltage source 14 through inductance 15 and rectifier 16. Capacitor 10 begins charging through inductance 15 and the low forward resistance of diode 16 as soon as the condenser voltage drops below the voltage level, $E_1$, of source 14. During charging, inductance 15 inherently stores energy since a current is flowing. When the voltage across condenser C reaches voltage $E_1$, voltage no longer exists across inductance 15 and as a consequence of the collapse of its energy, as it must, the inductance charges condenser C to a value theoretically equal to $2E_1$. The high reverse resistance of rectifier 16 prevents loss of condenser charge into the source 14. This is known as resonant charging. If there were no leakage paths across condenser 10, the voltage across condenser 10 would remain at the $2E_1$ level; and each time the switches **12*a*, 12*b* are closed, the pulse voltage would be $2E_1$. Unfortunately, current through resistors 13*a*, 13*b* contributes to the internal leakage paths of condenser 10, and to the reverse resistance of rectifier 16, to continually dissipate the charge on condenser 10. Such leakage current causes the condenser 10 voltage to decrease, as shown by the dotted line A in FIG. 2. Where there may be a long time interval between successive pulses, the condenser voltage will decay exponentially from $2E_1$ to $E_1$. The undesirable result is that the output pulse amplitude varies as a function of the rate at which switches 12*a*, 12*b*** are closed.

According to an important and characteristic feature of this invention, the resonant charging circuit, including the low resistance, high inductance coil 15 and the rectifier 16 with low forward resistance, is paralleled by a high voltage, high impedance charging circuit. That is, D.C. voltage source 17 in series with relatively high resistance 18 is connected also across storage condenser 10. The voltage, $E_2$, of source 17 is higher than voltage $E_1$ of source 14. Source voltage 17 is sufficiently high to supply the leakage losses and to maintain junction 19 at a voltage of $2E_1$. That is, the resistance of resistor 18 is so chosen with respect to the resistance values of the leakage paths that, in the steady state, the voltage at point 19 is $2E_1$. Since the resistances 18 and **13*a* and 13*b* are in series across source 17, the steady state voltage at junction 19 is determined by the simple proportionality of the several resistances. If $E_2$ is given, resistance, R, of resistor 18** should be chosen equal to $$R13\left(\frac{E_2}{2E_1}-1\right)$$

where R13 is the total leakage resistance in series with R. If, on the other hand, resistance, R, of resistor 18 is given, the voltage $E_2$ of source 17 should be chosen equal to $$2E_1\frac{R13+R}{R13}$$

Figures 2, 3:
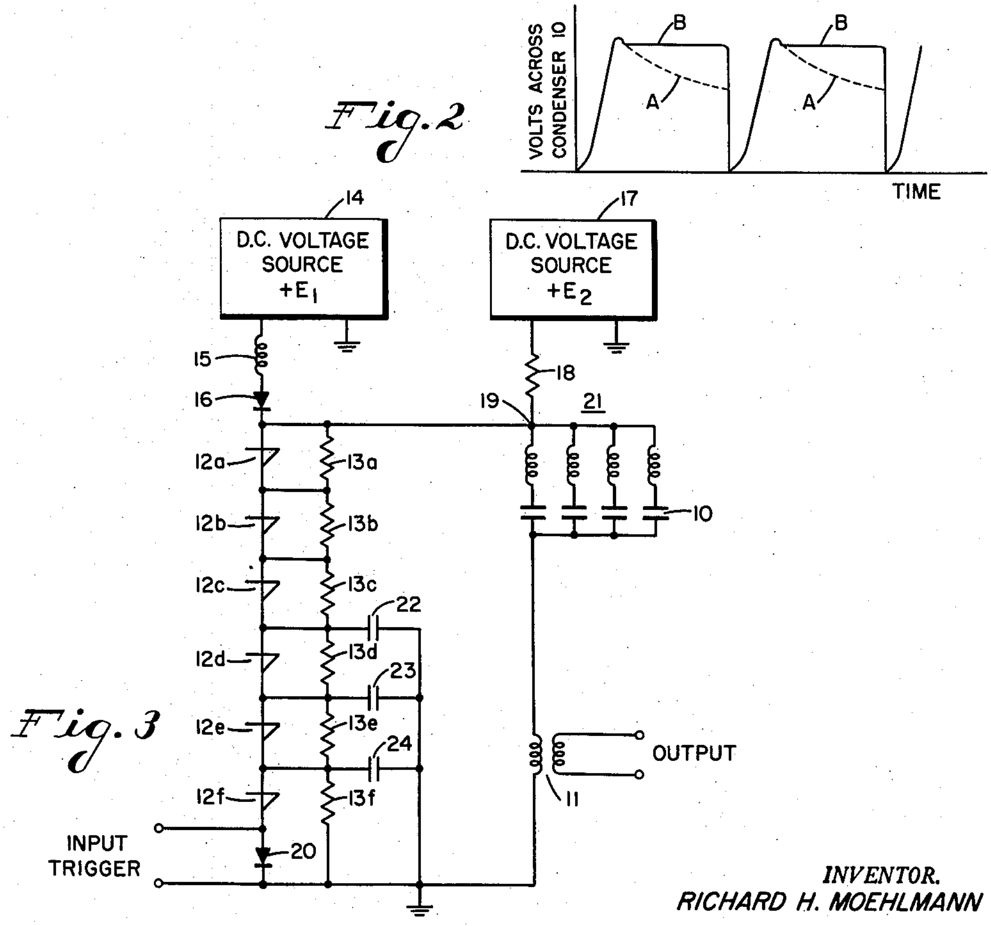
FIG. 2 shows the waveform of the voltage across the storage condenser in the circuit of FIG. 1.
FIG. 3 is a circuit diagram of a preferred embodiment of this invention.

The charge on condenser 10 will then remain steady as shown by line B of FIG. 2.

It has been found that the power dissipated in resistor 18 and source 17 is but a minute proportion of the total power consumed by the pulse generator and does not significantly affect the overall efficiency. In the practical generator shown in FIG. 3, the overall efficiency of the generator in converting D.C. power to pulse energy was 93%, while the extra power dissipated in the resistor 18 was of the order of 1% at full duty cycle.

The practical pulse generator shown in FIG. 3 operates in a manner similar to the generator of the simplified circuit of FIG. 2. Diodes **12*a* to 12*f* are each four-layer diodes that have the property of regeneratively switching from a very high to a very low impedance when a certain definite voltage, called the switching voltage, is applied across the diode. Preferably, the series of four-layer diodes are switched by means of the conventional high capacity diode 20 in series with the discharge circuit and with a trigger circuit connected thereacross. When a trigger pulse is applied across diode 20, the switching voltage across the four-layer switching diodes 12$a$ to 12$f$ is exceeded and the energy stored in condenser 10 is suddenly discharged through the primary of load transformer 11**.

In FIG. 3, a pulse forming network 21 is shown rather than a single capacitor. The network comprises a number of parallel capacitors each with a series inductance that functions like single large capacitors as far as the charging cycle is concerned, but has the advantage of generating a substantially rectangular pulse during discharge. One pulse forming network found to produce good results comprised four condensers having, respectively, 13,500 micromicrofarads, 1,500 micromicrofarads, 540 micromicrofarads and 270 micromicrofarads, while the series inductances were each 2.7 microhenries.

One pulse generator constructed as shown in FIG. 3 produced pulses of 2,500 volts, of .5 microsecond width and with pulse spacings as close as 20 microseconds. Voltage source $E_1$ was 420 volts, while $E_2$ was 865 volts. Inductance 15 was of low resistance, but had 15 microhenries inductance, while resistance R of resistor 18 was 47,000 ohms. Diodes 16 and 20 were each of the type commercially known as 1N649, while each of six four-layer diodes was of the Shockley 4J200 type. The resistance 13 across each diode was 100,000 ohms, making a total of 600,000 ohms in the series resistors 13$a$ to 13$f$. The smoothing condensers 22 were each 39 micromicrofarads. The transformer 11 had a step-up ratio of about 1 to 7. In spite of the severe operating requirements, the pulses at the output were of rectangular configuration, as shown in FIG. 2, and were always of uniform amplitude throughout a wide range of pulse spacings.

The pulse generator of this invention will generate pulses of uniform high power even though the repetition rate of the pulses may vary widely. The power conversion efficiency of the pulse generator of this invention is high.

What is claimed is:

1. A pulse generator comprising a power storage condenser means and a load connected in series; an inductance, a rectifier, and a first D.C. source of predetermined voltage connected in series and across said condenser means and load for resonantly charging said condenser means to substantially twice the voltage of said D.C. source, the impedance of the charging circuit being relatively low for rapid charging rate, switch means connected across said condenser means and load for discharging said condenser means through said load, a second D.C. source connected across said condenser and load, the circuit of said second D.C. source having relatively high impedance compared to the impedance of said charging circuit and the voltage value of said second D.C. source being relatively high compared to the charge voltage of said condenser means to maintain substantially constant, between successive operations of the switch, the charge voltage of said condenser.

2. A pulse generator comprising a power storage condenser means and a load connected in series, a first D.C. source and a resonant charging circuit connected across said condenser means for charging said condenser means to substantially twice the voltage of said first D.C. source, switch means connected across said condenser means and said load for discharging said condenser means through said load, a second D.C. source connected across said condenser and load and in parallel with said resonant charging circuit, the circuit of said second D.C. source having a higher impedance than the impedance of said resonant charging circuit and the voltage value of said second D.C. source being sufficiently high to maintain substantially constant, between successive operations of the switch, the charge voltage of said condenser means.

3. A pulse generator comprising a power storage condenser means and a load connected in series, a first D.C. voltage source of voltage $E_1$ and an inductance and a rectifier connected in series and across said condenser-load for resonantly charging said condenser means to a voltage of substantially $2E_1$, a second D.C. voltage source having resistance connected across said condenser-load, the voltage of said second voltage source being higher than $2E_1$, and the value of said resistance being so chosen with respect to leakage resistance across said storage means as to maintain said condenser voltage substantially at a value equal to $2E_1$.

4. A pulse generator comprising a capacitive storage means, a first charging circuit including a D.C. source and having relatively low resistance and relatively high inductance for rapidly and resonantly charging said storage means to a voltage higher than the voltage of said D.C. source, a load circuit, a switch circuit for discharging the energy of said storage means into said load circuit, and a second charging circuit having a voltage higher than the resonantly charged voltage of said capacitive storage means, and having a resistance so selected with respect to the leakage resistance of said capacitive storage means as to maintain substantially constant the charge on said storage means between each charge and discharge of said storage means.

References Cited in the file of this patent

UNITED STATES PATENTS

| | | |
|---|---|---|
| 2,250,102 | Klemperer | July 22, 1941 |
| 2,891,209 | Sclralk | June 16, 1959 |